United States Patent
Funane

(10) Patent No.: US 8,922,824 B2
(45) Date of Patent: Dec. 30, 2014

(54) IMAGE FORMING APPARATUS, METHOD FOR CONTROLLING THE SAME, AND STORAGE MEDIUM

(71) Applicant: Canon Kabushiki Kaisha, Tokyo (JP)

(72) Inventor: Nao Funane, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/153,151

(22) Filed: Jan. 13, 2014

(65) Prior Publication Data

US 2014/0126023 A1  May 8, 2014

Related U.S. Application Data

(63) Continuation of application No. 12/939,805, filed on Nov. 4, 2010, now Pat. No. 8,654,367.

(30) Foreign Application Priority Data

Dec. 7, 2009  (JP) .................................. 2009-278011

(51) Int. Cl.
| | |
|---|---|
| *G06K 15/00* | (2006.01) |
| *G06F 3/12* | (2006.01) |
| *H04N 1/21* | (2006.01) |
| *G06F 3/06* | (2006.01) |
| *H04N 1/00* | (2006.01) |

(52) U.S. Cl.
CPC ................ *H04N 1/21* (2013.01); *G06F 3/1206* (2013.01); *G06F 3/1229* (2013.01); *G06F 3/1207* (2013.01); *G06F 3/1288* (2013.01); *G06F 3/1205* (2013.01); *G06F 3/1204* (2013.01); *G06F 3/0619* (2013.01); *G06F 3/065* (2013.01); *G06F 3/0676* (2013.01); *H04N 1/00278* (2013.01)

USPC ....... 358/1.16; 358/1.13; 358/1.14; 358/1.15; 358/1.17; 358/1.1

(58) Field of Classification Search
None
See application file for complete search history.

(56) References Cited

U.S. PATENT DOCUMENTS

| | | | |
|---|---|---|---|
| 2002/0060703 A1 | 5/2002 | Tsukada | |
| 2005/0141000 A1 | 6/2005 | Yamada et al. | |
| 2006/0087680 A1* | 4/2006 | Maeda | 358/1.15 |

(Continued)

FOREIGN PATENT DOCUMENTS

JP    2003-030109 A    1/2003

(Continued)

OTHER PUBLICATIONS

Japanese Office Action issued in corresponding Japanese application No. 2009-278011 on Feb. 18, 2014.
Japanese Office Action issued in corresponding application No. 2009-278011 on Nov. 12, 2013.

*Primary Examiner* — Satwant Singh
(74) *Attorney, Agent, or Firm* — Carter, DeLuca, Farrell & Schmidt, LLP

(57) ABSTRACT

An image forming apparatus includes an address book management application which receives from a client PC an instruction as to address data stored in an HDD of an image forming apparatus. When the instruction is a backup instruction, the address book management application acquires the address data from an address data storage area, creates a backup file from the acquired address data, and stores the created backup file in a backup area of the HDD. When the instruction is a restore instruction, the address book management application restores the backup file stored in the backup area, as the address data in the address data storage area.

20 Claims, 11 Drawing Sheets

(56) References Cited

U.S. PATENT DOCUMENTS

| | | |
|---|---|---|
| 2006/0129659 A1 | 6/2006 | Kawai et al. |
| 2007/0086022 A1* | 4/2007 | Kumagai ................ 358/1.1 |
| 2008/0104345 A1* | 5/2008 | Maruyama et al. .......... 711/162 |
| 2008/0297829 A1 | 12/2008 | Paek |
| 2009/0195821 A1 | 8/2009 | Matoba |
| 2010/0002263 A1* | 1/2010 | Shindoh ................ 358/1.16 |
| 2013/0128313 A1 | 5/2013 | Hirokawa et al. |

FOREIGN PATENT DOCUMENTS

| | | |
|---|---|---|
| JP | 2004-070377 A | 3/2004 |
| JP | 2005-063047 A | 3/2005 |
| JP | 2005-102133 A | 4/2005 |
| JP | 2006-173679 A | 6/2006 |
| JP | 2008-108185 A | 5/2008 |
| JP | 2009-059444 A | 3/2009 |

* cited by examiner

IMAGE FORMING APPARATUS, METHOD FOR CONTROLLING THE SAME, AND STORAGE MEDIUM

CROSS REFERENCE TO RELATED APPLICATIONS

This application is a continuation of U.S. patent application Ser. No. 12/939,805, filed Nov. 4, 2010, which claims the benefit of and priority to Japanese Patent Application No. 2009-278011, filed Dec. 7, 2009, the entire contents of each of which are hereby incorporated by reference herein in their entirety.

BACKGROUND OF THE INVENTION

1. Field of the Invention

The present invention relates to an image forming apparatus which manages setting data therein, a method for controlling the image forming apparatus, and a storage medium.

2. Description of the Related Art

Commonly, image forming apparatuses such as copying machines are provided with a function for saving in its hard disk (HD) address data (fax number, mail address, etc.) constituting an address book, section ID, login user information, and other setting information of the image forming apparatus as setting data. A user can perform various pieces of processing with an image forming apparatus by using the stored setting data. For example, when transmitting a fax or mail with attached scanned data, stored address data is read out and the address book is displayed on an operation panel of the image forming apparatus. The user can transmit a fax or mail by selecting a destination address from the address book.

With this configuration, the image forming apparatus can store the above-mentioned setting data in an external apparatus such as a server apparatus via a network, receive the setting data from the external apparatus, and restore it as its own setting data. For example, the following technique is discussed in Japanese Patent Application Laid-Open No. 2006-173679. In the event that an external apparatus transmits wrong address data to the image forming apparatus for the purpose of importing new address data into the address book of the image forming apparatus, the image forming apparatus stores the wrong address data in the address book. More specifically, the external apparatus transmits to the image forming apparatus the backup data of the address book stored in the external apparatus together with a restore instruction. The image forming apparatus receives the backup data of the address book from the external apparatus and restores the address book in response to the restore instruction from the external apparatus.

However, with the above-mentioned conventional technique, since the external apparatus needs to transmit data to the image forming apparatus via the network to restore setting data, a communication error may be caused by network failure during transmission of the setting data. If a communication error occurs during transmission of the setting data to be restored, correct data cannot be transmitted until the error is corrected and therefore wrong data remains set in the image forming apparatus. This situation has been a problem that hinders the user from performing various operations by using the image forming apparatus. For example, when the setting data is address data, transmission of the setting data may take at least 10 minutes depending on the amount of information. In this case, communication between the external apparatus and the image forming apparatus is highly likely to be disconnected during the restore processing for the address data.

With the above-mentioned conventional technique, since the image forming apparatus transmits a backup file of the setting data to the external apparatus for storage in the external apparatus, the setting data exists both in the external apparatus and the image forming apparatus, which causes a security problem. Commonly, the image forming apparatus manages its users so that only users registered in the image forming apparatus can use it. When a user wants to use the image forming apparatus, the user needs to enter a relevant login ID and password registered therein. In this case, when confidential data such as an address book is stored in the external apparatus, a user not having the authority may possibly browse and edit the confidential data depending on the security setting in the destination external apparatus. Therefore, there has been a problem that, when storing the setting data of the image forming apparatus in the external apparatus, not only the security setting of the image forming apparatus but also the security setting of the destination external apparatus must be taken into consideration.

SUMMARY OF THE INVENTION

According to an aspect of the present invention, an image forming apparatus includes: a storage unit configured to store information about the image forming apparatus; a receiving unit configured to receive from the information processing apparatus an instruction as to setting data of the image forming apparatus stored in a setting data storage area of the storage unit; a backup unit configured to perform, when the instruction is a backup instruction of the setting data, backing up by acquiring the setting data from the setting data storage area, creating a backup file, and storing the created backup file in a backup area of the storage unit; and a restoration unit configured to restore, when the instruction is a restore instruction of the setting data, the stored backup file as setting data in the setting data storage area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the present specification, address data constituting an address book will be described below as exemplary setting data which is setting information of an image forming apparatus. However, the setting data is not limited thereto but may be other setting data such as section ID information and login user name.

Figure 1:
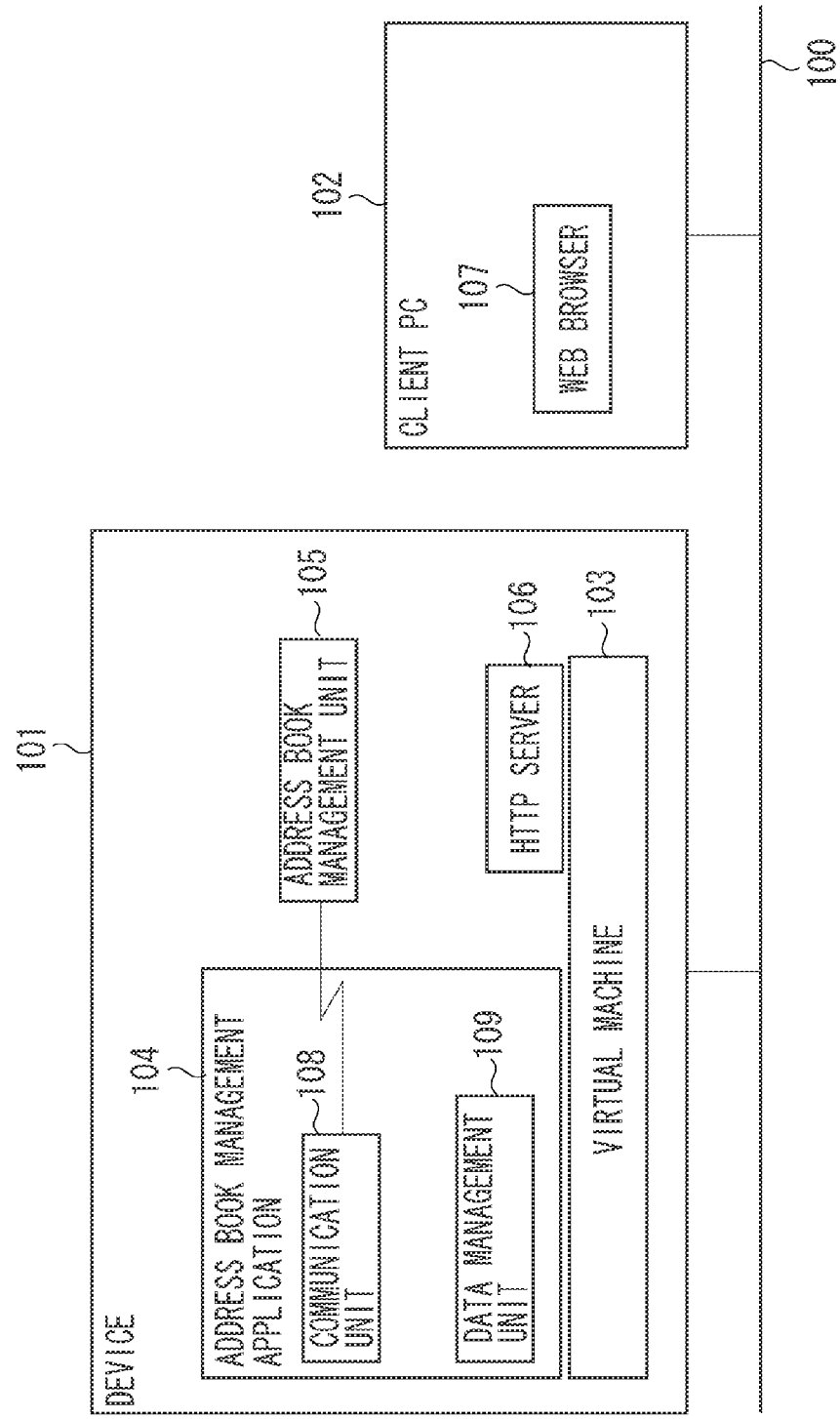
FIG. 1 illustrates a configuration of a data management system according to an exemplary embodiment of the present invention.

FIG. 1 illustrates an exemplary configuration of a data management system according to a first exemplary embodiment. An image forming apparatus 101 is a printer or multifunction peripheral (MFP). A client personal computer (PC) 102, also referred to as client terminal, is an information processing apparatus on which a user performs various operations and printing. The image forming apparatus 101 is connectable with the client PC 102 (information processing apparatus). In the data management system illustrated in FIG. 1, the image forming apparatus 101 and the client PC 102 are connected with each other via a network 100.

A virtual machine 103 operates on the image forming apparatus 101. An address book management application 104 operates on the virtual machine 103. It is also possible to add and delete other applications to/from the virtual machine 103. JavaVM (registered trademark) from SUN MICROSYSTEMS of the U.S.A. is an exemplary virtual machine. The address book management application 104 includes a communication unit 108 and a data management unit 109.

The communication unit 108 is provided with a function for communicating with an address book management unit 105 (described below) via Web services. The communication unit 108 is also provided with a function for performing encrypted communication based on the secure socket layer (SSL) (hereinafter, referred to as SSL-based encrypted communication). Communication via Web services in the present exemplary embodiment is performed inside the image forming apparatus 101, and less likely to cause failure and a communication error in comparison with communication via a network. The data management unit 109 manages various data to be handled by the address book management application 104. For example, the data management unit 109 is provided with a function for recording in a backup area of the image forming apparatus 101 address data acquired from the address book management unit 105 (described below) by the communication unit 108, to back up the address data.

In addition to the address book management application 104 operating on the virtual machine 103, the image forming apparatus 101 includes the address book management unit 105 for managing the address book of the image forming apparatus 101. The address book management unit 105 is provided with address book management functions such as a function for holding address information used for fax and mail transmission in the address data storage area (setting data storage area) of the image forming apparatus 101 and a function for reading it in response to a request from the operation unit of the image forming apparatus 101.

The address book management unit 105 holds data regarding its own state in the database format. This is referred to as management information base (MIB) information. The address book management unit 105 includes Web services availablity/nonavailability setting information as one piece of the MIB information. When the Web services availablity/nonavailability setting information can be used, the address book management unit 105 accepts Web service communication. Before starting communication with the address book management unit 105 via Web services, the communication unit 108 of the address book management application 104 acquires the Web services availablity/nonavailability setting information of the MIB of the address book management unit 105. When the result of the Web services availablity/nonavailability setting information is "Nonavailable", the communication unit 108 sets it to "Available." When setting is successfully completed, communication with the address book management unit 105 is enabled and the communication unit 108 subsequently performs Web service communication.

The image forming apparatus 101 is also provided with a HTTP server 106 used to display screens for address book management described below. The HTTP server 106 can connect with the image forming apparatus 101 via a web browser 107 of the client PC 102 to display an address book management page on the client PC 102.

Figure 2:
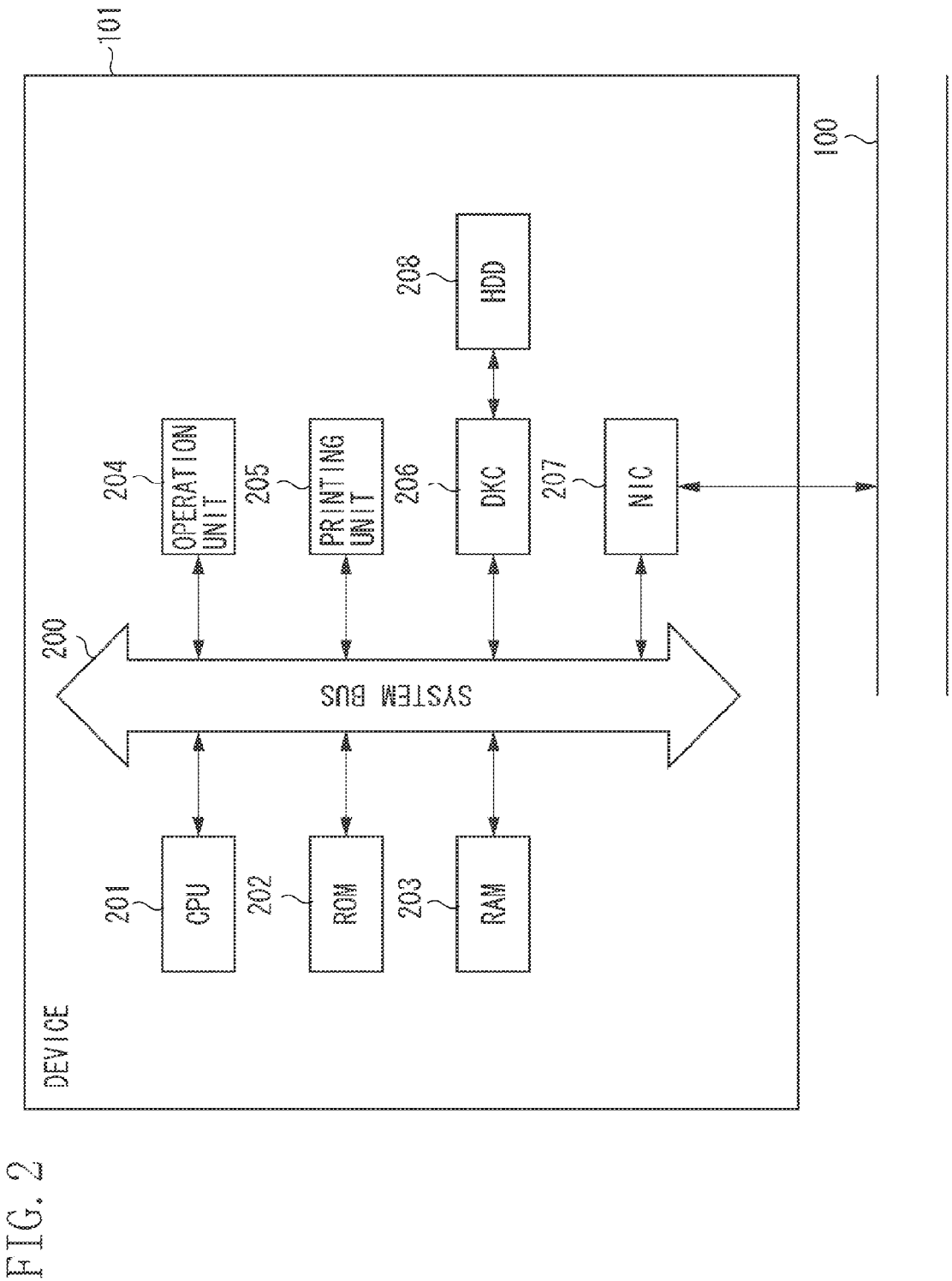
FIG. 2 is a block diagram illustrating a configuration of an image forming apparatus.
Figure 11:
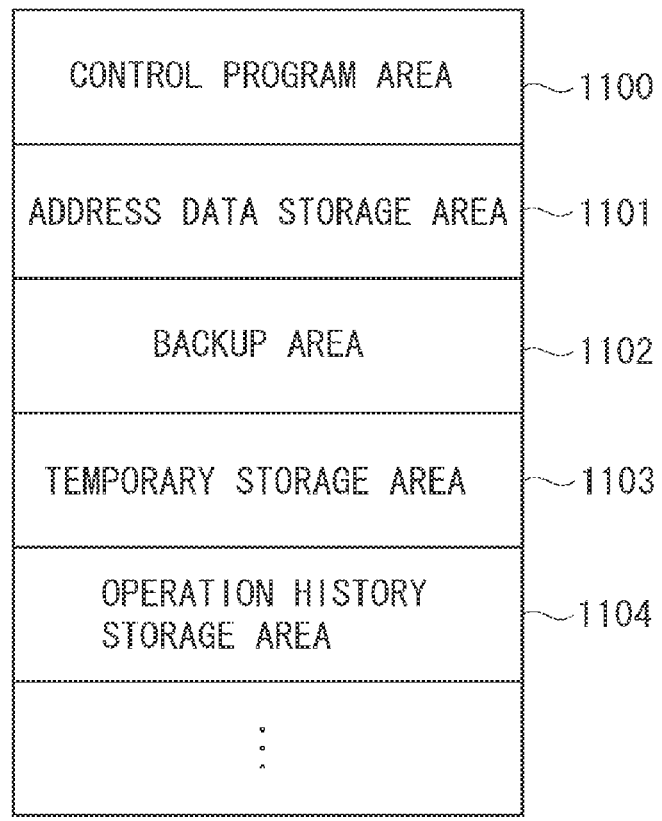
FIG. 11 illustrates an exemplary memory map in a hard disk drive (HDD) of the image forming apparatus.

FIG. 2 is a block diagram illustrating a configuration of the image forming apparatus 101 constituting the data management system according to the present exemplary embodiment illustrated in FIG. 1. Based on the address book management application 104 and a control program for the address book management unit 105 illustrated in FIG. 1, a central processing unit (CPU) 201 controls each component connected to a system bus 200. The control program is stored in storage units such as a read-only memory (ROM) 202 and a hard disk drive (HDD) 208. When the control program is stored in the HDD 208, the CPU 201 accesses the HDD 208 via a disk controller (DKC) 206. A random access memory (RAM) 203 serves as a main memory and work area for the CPU 201. A memory map of the HDD 208 will be described below with reference to FIG. 11. The HDD 208 includes a control program area 1100, an address data storage area 1101, a backup area 1102, a temporary storage area 1103, and an operation history storage area 1104. The control program area 1100 is used to store the above-mentioned address book management application 104 and the control program for the address book management unit 105. The address data storage area 1101 is managed by the address book management unit 105 to store address data of the address book. The backup area 1102 is managed by the address book management application 104 to store an address data backup file. The storage area 1103 is managed by the address book management application 104 to temporarily store information. The operation history storage area 1104 is managed by the address book management application 104 to store user information added and deleted to/from the address book.

An operation unit 204 includes a display unit for displaying information to the user and an input unit for receiving instructions and inputs from the user. In response to an instruction from the operation unit 204 or a client PC 102, the printing unit (printer engine) 205 performs print processing, i.e., outputs an image signal as output information under control of the CPU 201. The CPU 201 can communicate with a computer on the network 100 via a network interface card (NIC) 207.

Figure 3:
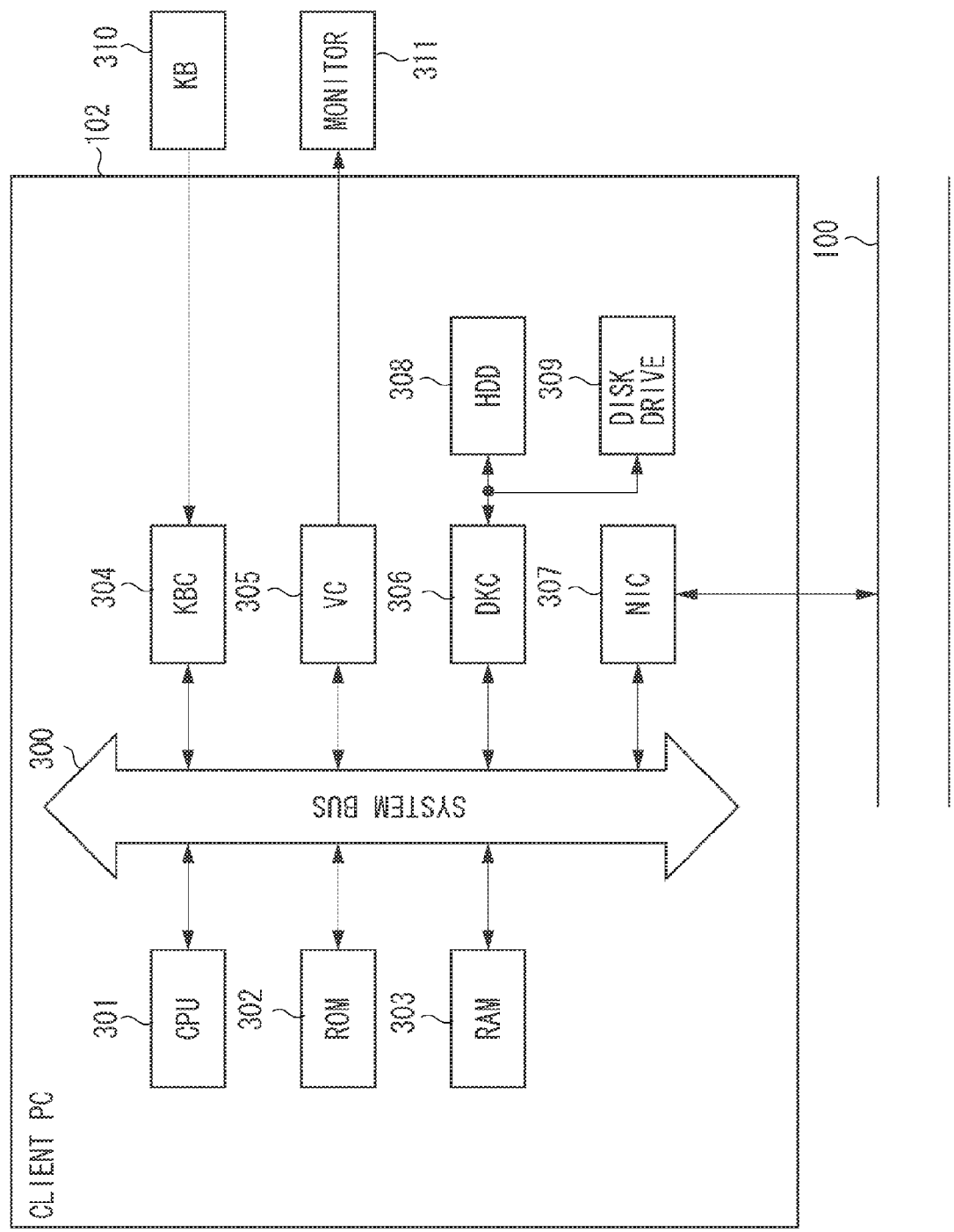
FIG. 3 is a block diagram illustrating a configuration of an information processing apparatus.

FIG. 3 is a block diagram illustrating a configuration of the client PC 102 (information processing apparatus) constituting the data management system according to the present exemplary embodiment illustrated in FIG. 1. The CPU 301 executes a program stored in a ROM 302 and a hard disk drive (HDD) 308 by using a RAM 303 as a work memory to control each component (described below) via a system bus 300.

The HDD 308 stores an operating system (OS) and various programs and data. The CPU 301 accesses the HDD 308 and a disk drive 309 via a disk controller (DKC) 306 to install various programs in the HDD 308.

The CPU 301 displays a user interface (UI) on a monitor 311 via a video card (VC) 305 following the program. The web browser 107 in FIG. 1 will be displayed on the monitor 311. The user operates a keyboard (KB) 310 and a pointing device such as a mouse to give instructions and inputs to the UI. The CPU 301 receives instructions and inputs from the user via a keyboard controller (KBC) 304, and performs various pieces of processing in response to each instruction and input received.

The CPU 301 can communicate with other computers and devices on the network 100 via the network interface card (NIC) 307.

Figure 4:
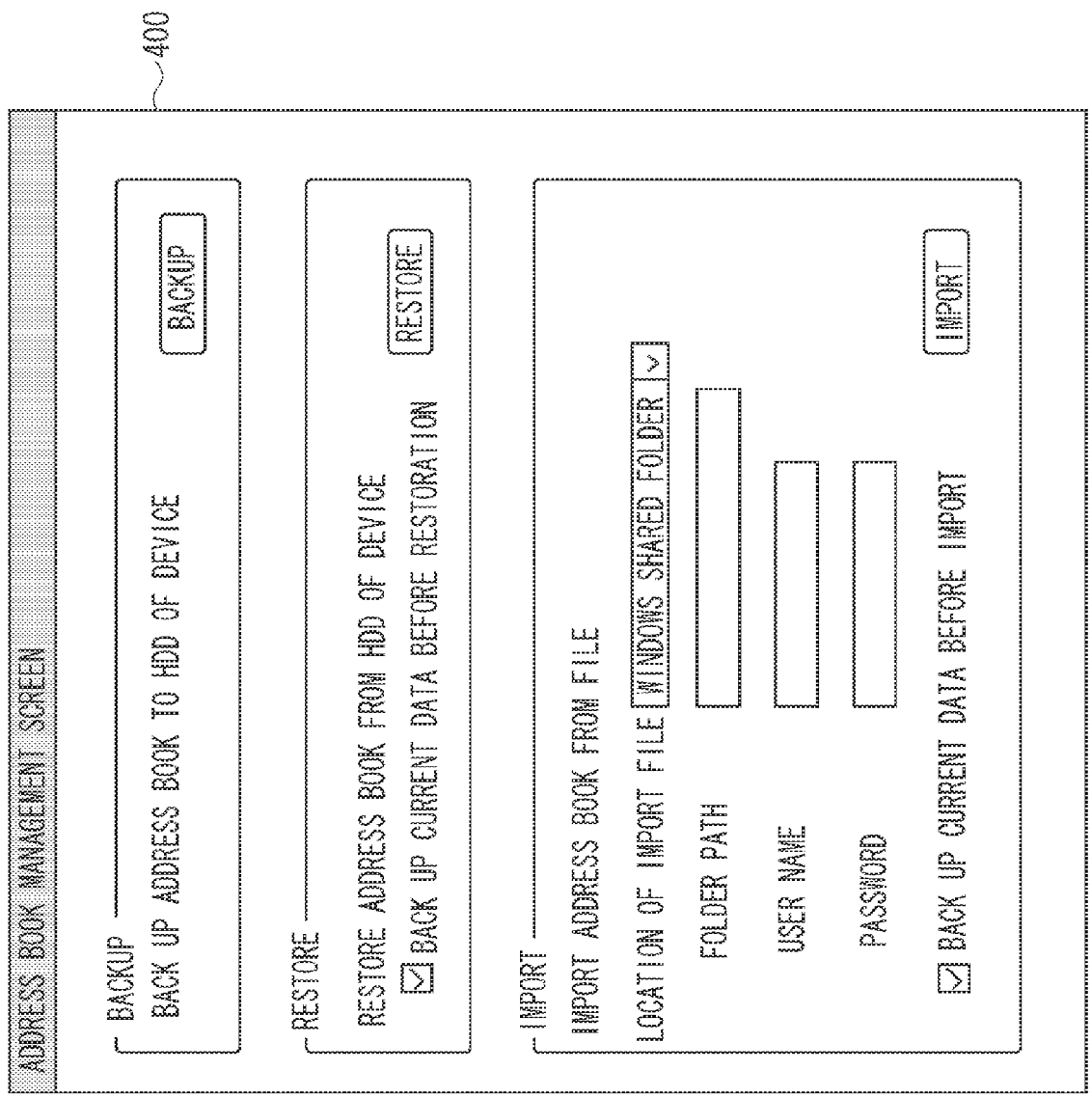
FIG. 4 illustrates an exemplary address book management screen.

FIG. 4 illustrates an exemplary address book management screen displayed on the monitor 311 of the client PC 102. A system administrator communicates with the image forming apparatus 101 via the address book management screen 400 to manage the address book.

The image forming apparatus 101 includes the HTTP server 106 to provide the client PC 102 with the address book management screen 400. The system administrator operating the client PC 102 can interactively communicate with the image forming apparatus 101 via the address book management screen 400. More specifically, the system administrator specifies a URL on the web browser 107 displayed on the monitor 311 of the client PC 102. The URL specified here refers to a URL of the address book management screen 400 provided by the HTTP server 106 of the image forming apparatus 101. The HTTP server 106 returns data of a page corresponding to the specified URL to the client PC 102. Then, the address book management screen 400 is displayed on the web browser 107 on the monitor 311.

The address book management screen 400 includes a Backup button, a Restore button, and an Import button. When the system administrator presses any button by operating a pointing device or the KB 310, an operation instruction (backup instruction, restore instruction, or import instruction) associated with each individual button is transmitted to the image forming apparatus 101.

Figure 5:
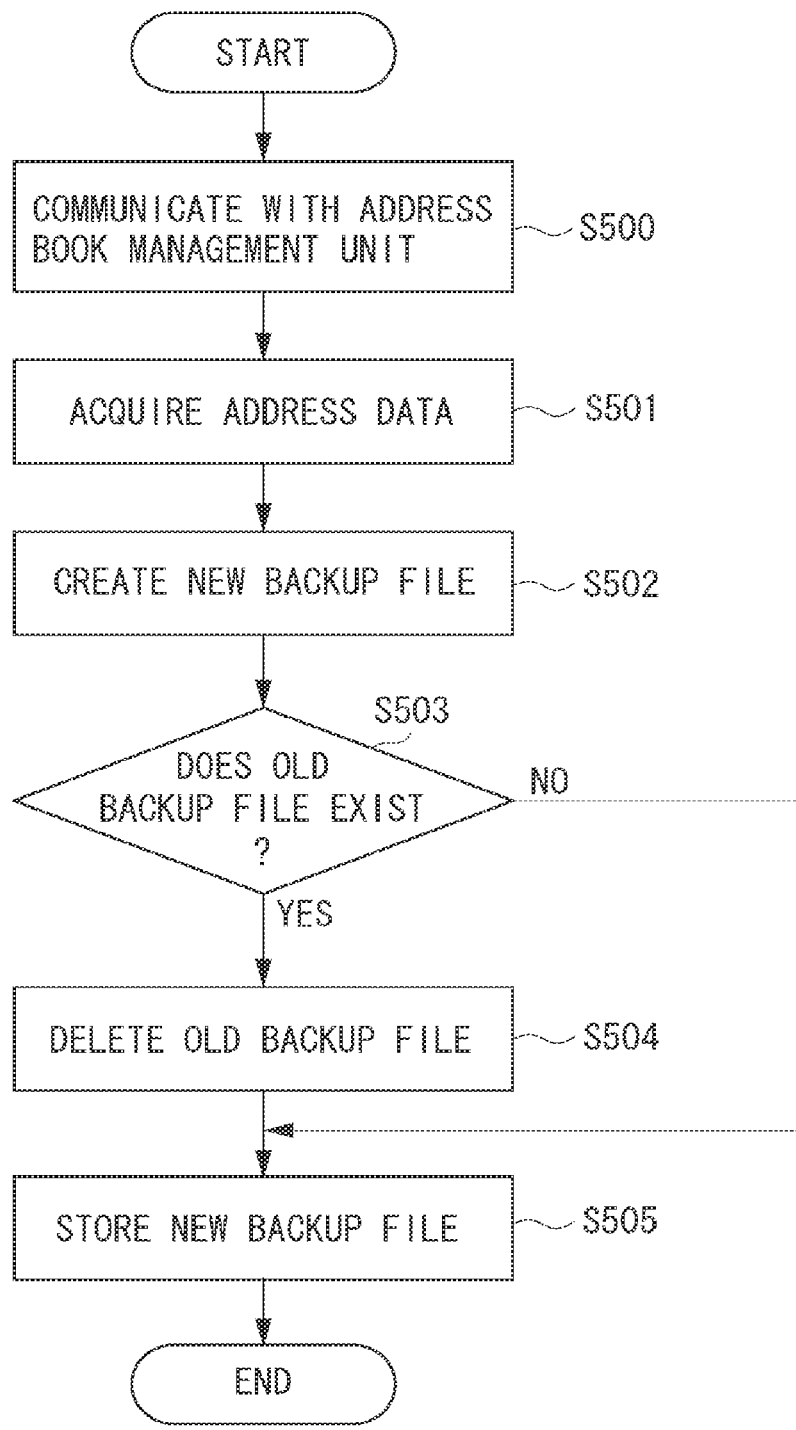
FIG. 5 is a flow chart illustrating processing for backing up an address book.

The processing for backing up the address data constituting the address book (backup processing) in the present exemplary embodiment will be described below with reference to the flowchart in FIG. 5. Processing in each step of the flow chart in FIG. 5 is executed when the CPU 201 loads a control program stored in the ROM 202 or the HDD 208 of the image forming apparatus 101 into the RAM 203 and then controls each component of the image forming apparatus 101 according to the control program. The flow chart processes two different backup files: a backup file that has been stored in the backup area 1102 when the processing is started, and a backup file that is created during the processing. To distinguish between the two backup files, hereinafter, the former is referred to as old new backup file and the latter as new backup file. These nominal designations also apply to the descriptions of FIGS. 6 and 7.

When the system administrator presses the backup button in the address book management screen 400 displayed on the web browser 107, the address book management application 104 receives a backup instruction from the client PC 102. When the address book management application 104 receives the backup instruction, the processing of the flow chart in FIG. 5 is started.

In step S500, the communication unit 108 communicates with the address book management unit 105 via Web services. When communication in step S500 is successfully completed, in step S501, the data management unit 109 acquires address data from the address book management unit 105 via the communication unit 108. The address data is stored in the address data storage area 1101 of the HDD 208 managed by the address book management unit 105.

In step S502, the data management unit 109 creates a new backup file based on the acquired address data. When the address book management unit 105 is provided with a plurality of address books, the data management unit 109 integrates the plurality of address books to create one backup file. In step S503, the data management unit 109 determines whether an old backup file (a backup file created and stored in advance) exists by checking the backup area 1102 of the HDD 208. When the data management unit 109 determines that an old backup file exists (YES in step S503), the processing proceeds to step S504. Otherwise, when it determines that an old backup file does not exist (NO in step S503), the processing proceeds to step S505.

In step S504, the data management unit 109 deletes the old backup file. In step S505, the data management unit 109 stores the new backup file created in step S502. The backup file is stored in the backup area 1102 of the HDD 208 of the image forming apparatus 101 managed by the address book management application 104.

Although the present exemplary embodiment has specifically been described based on a case where the address book management application 104 performs once the backup processing upon reception of a backup instruction, the address book management screen 400 may also be provided with a means for setting an execution schedule. In this case, the address book management application 104 has a timer and performs backup processing based on the set execution schedule. Backup processing execution time and interval can be desirably set in the schedule. More specifically, it is desirable to make schedule setting so that backup processing is executed in the middle of the night during which the image forming apparatus 101 is not frequently used and so that the backup processing is periodically executed.

Figure 6:
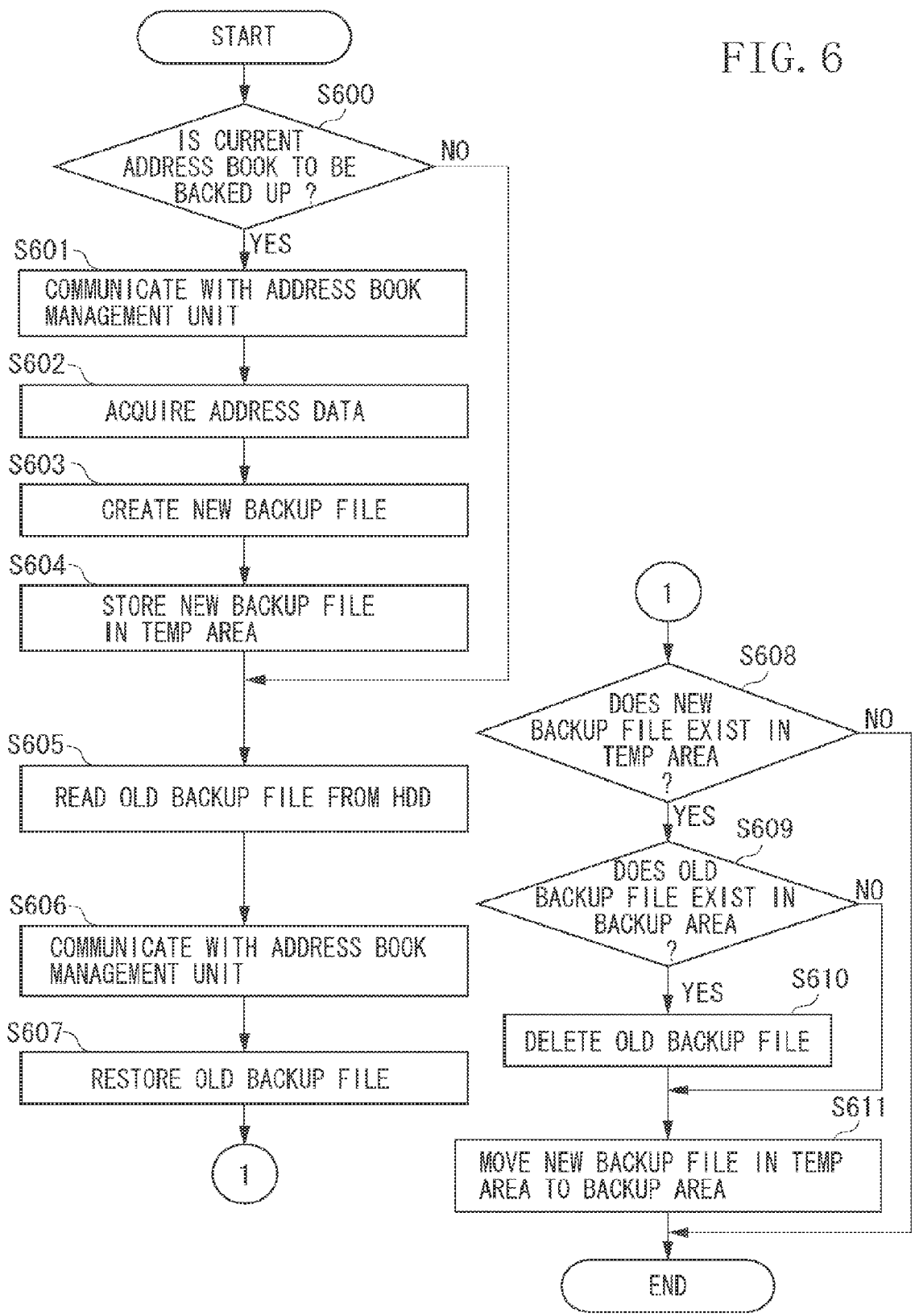
FIG. 6 is a flow chart illustrating processing for restoring the address book.

Restore processing of the address book by using the backup file stored in the backup processing (described above with reference to FIG. 5) in the present exemplary embodiment will be described below with reference to the flow chart in FIG. 6. Processing in each step of the flow chart in FIG. 6 is executed when the CPU 201 loads a control program stored in the ROM 202 or the HDD 208 of the image forming apparatus 101 into the RAM 203 and then controls each component of the image forming apparatus 101 according to the control program. The flow chart processes two different backup files: a backup file that has been stored in the backup area 1102 when the processing is started, and a backup file that is created during the processing. To distinguish between the two backup files, hereinafter, the former is referred to as old new backup file and the latter as new backup file.

When the system administrator presses the restore button in the address book management screen 400 displayed on the web browser 107, the address book management application 104 receives a restore instruction from the client PC 102. When the address book management application 104 receives the restore instruction, the processing of the flow chart in FIG. 6 is started. The address book management screen 400 includes a check box for specifying whether the current address book before restore processing is to be backed up. When the system administrator presses the restore button, the client PC 102 transmits to the address book management application 104 a restore instruction including the state of the check box for specifying whether the current address book is to be backed up. When the address book management application 104 receives the restore instruction, it also receives the state of the check box.

In step S600, upon reception of the restore instruction, the address book management application 104 determines whether the current address book is to be backed up based on the state of the check box. When the check box is checked and the address book management application 104 determines that the current address book is to be backed up (YES in step S600), the processing proceeds to step S601. Otherwise, when the check box is not checked and it determines that the current address book is not to be backed up (NO in step S600), the processing proceeds to step S605. Since the processing for backing up the current address book in steps S601 to S603 is similar to the processing in steps S500 to S502 of the flow chart in FIG. 5, explanations will be omitted. If the current address book has been updated since it was last backed up, the update will be lost after the restore processing. To make the update intact, the image forming apparatus 101 backs up the current address book. There are two types of update: wrong update which should be restored and correct update which should not be restored. The updated current address book will be backed up to check wrong update and import the correct update again.

After the data management unit 109 creates a new backup file in step S603, in step S604, the data management unit 109 stores the new backup file in the temporary storage area 1103 (Temp area) of the HDD 208 managed by the address book management application 104. By once storing the new backup file in the Temp area before restoring the old backup file in this way, the new backup file can be retreated and prevented from being overwritten by the old backup file.

In step S605, the data management unit 109 reads the old backup file from the backup area 1102 of the HDD 208 of the image forming apparatus 101. In step S606, the communication unit 108 communicates with the address book management unit 105 via Web services. In step S607, the data management unit 109 issues to the address book management unit 105 via the communication unit 108 an instruction to overwrite the address data held by the address book management unit 105 with the old backup file read in step S605. Upon reception of the relevant instruction from the data management unit 109, the address book management unit 105 performs the restore processing in response to the instruction, and overwrites the address data in the address data storage area 1101 with the old backup file.

In step S608, the data management unit 109 determines whether or not a new backup file is stored in the Temp area. When the data management unit 109 determines that a new backup file is not stored in the Temp area (NO in step S608), the processing ends. Otherwise, when the data management unit 109 determines that a new backup file is stored in the Temp area (YES in step S608), the processing proceeds to step S609. In step S609, the data management unit 109 determines whether or not the old backup file is stored in the backup area 1102. When the data management unit 109 determines that the old backup file is stored in the backup area 1102 (YES in step S609), the processing proceeds to step S610. Otherwise, when the data management unit 109 determines that the old backup file is not stored in the backup area 1102 (NO in step S609), the processing proceeds to step S611. In step S610, the data management unit 109 deletes the old backup file stored in the backup area 1102. In step S611, the data management unit 109 moves the new backup file stored in the Temp area to the backup area 1102.

When the backup file is stored in an external apparatus, not the image forming apparatus 101, as is the case with the conventional technique, the image forming apparatus 101 needs to have the backup file transmitted from the external apparatus at the time of restore processing. If an error occurs during transmission, the restore processing cannot be performed by the image forming apparatus 101. In the present exemplary embodiment, the address data (setting data) is backed up within the image forming apparatus 101, and the restore processing is performed by using the address data backed up in the image forming apparatus 101. This eliminates the need of transmitting the backup file between the image forming apparatus 101 and the client PC, enabling preventing the restore processing from being hindered. Further, since the address data is stored in the image forming apparatus 101 without being transmitted to the outside, the address data can be backed up with improved security.

Although the present exemplary embodiment has specifically been described based on a case where the address book management application 104 performs once the restore processing upon reception of a restore instruction, the address book management screen 400 may also be provided with a means for setting an execution schedule. In this case, the address book management application 104 has a timer and performs backup processing based on the set execution schedule. Processing execution time and interval can be desirably set in the schedule. It is desirable to make schedule setting so that backup processing is executed in the middle of the night during which the image forming apparatus 101 is not frequently used and the restore processing is periodically executed. When the system administrator strictly manages the address book, for example, performing the restore processing once a day enables maintaining the original correct state of the address book to/from which general users have freely added and deleted data in routine works. This method allows addresses deleted by general users by mistake to be automatically restored on a single device basis. The method can also prevent addresses that have been temporarily used and no longer necessary and personal addresses (personal information) which may cause a security problem, from remaining in the image forming apparatus 101.

Further, when automatically performing periodical restore processing in this way, the processing may be changed depending on the type of user who added and deleted data to/from the address book. More specifically, when a user adds or deletes data to/from the address book, the data management unit 109 stores information about the user who has performed the relevant operation in the operation history storage area 1104 of the HDD 208 of the image forming apparatus 101 managed by the address book management application 104. At the time of periodical restore processing, the data management unit 109 may check operation history that has been updated since the last restoration, leave addresses updated by the system administrator as it is, and restore addresses updated by general users.

Processing for backing up the current address book performed before importing new address data into the address book (import processing) in the present exemplary embodiment will be described below with reference to the flow chart in FIG. 7. Processing in each step of the flow chart in FIG. 7 is executed when the CPU 201 loads a control program stored in the ROM 202 or the HDD 208 of the image forming apparatus 101 into the RAM 203 and then controls each component of the image forming apparatus 101 according to the control program.

When the system administrator presses the import button in the address book management screen 400 displayed on the web browser 107, the address book management application 104 receives an import instruction from the client PC 102.

Figure 7:
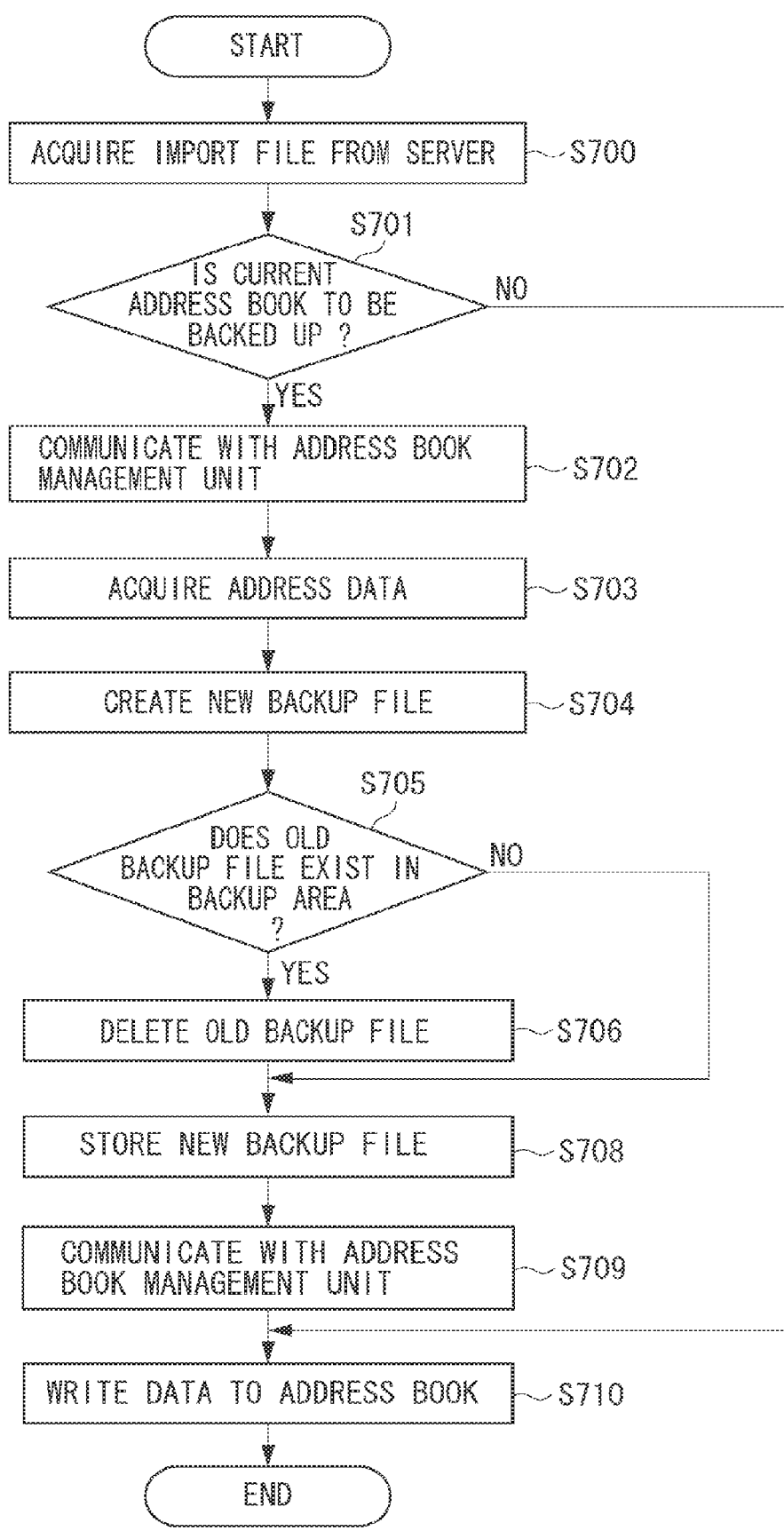
FIG. 7 is a flow chart illustrating processing for importing data into the address book.

When the address book management application 104 receives the import instruction, the processing of the flow chart in FIG. 7 is started. The address book management screen 400 includes a check box for specifying whether or not the current address book before import processing is to be backed up. The address book management screen 400 also includes a control for setting a location storing the file to be imported (hereinafter referred to as import file). A shared folder of Windows (registered trademark) and the file transfer program (FTP) are provided as options for the location storing the import file. Options for target location are not limited thereto but may be any location where a target file can be acquired from the address book management application 104. The address book management screen 400 also includes a control for inputting a folder path of a folder storing a target file and a control for inputting a user name and password enabling reading the target file from the specified folder.

When the system administrator presses the import button, the client PC 102 transmits to the address book management application 104 a restore instruction including the state of the check box for specifying whether the current address book is to be backed up and setting information of each control. Then, the address book management application 104 receives the restore instruction together with the state of the check box and the setting information of each control.

In step S700, the address book management application 104 accesses a folder storing the import file by using the user name and password included in the received setting information to acquire the import file. After the import file has been acquired, in step S701, the address book management application 104 determines whether or not the address book before import processing is to be backed up based on the state of the check box. When the check box is checked and the address book management application 104 determines that the address book before import processing is to be backed up (YES in step S701), the processing proceeds to step S702. Otherwise, when the check box is not checked and the address book management application 104 determines that the address book before import processing is not to be backed up (NO in step S701), the processing proceeds to step S709. Since the processing in steps S702 to S708 is similar to the processing in steps S500 to S505 of the flow chart in FIG. 5, explanations will be omitted.

In step S709, the communication unit 108 communicates with the address book management unit 105 via Web services. In step S710, the data management unit 109 issues to the address book management unit 105 via the communication unit 108 an instruction to write the data of the import file read in step S700 to the address book data held by the address book management unit 105. Upon reception of the relevant instruction from the data management unit 109, the address book management unit 105 performs import processing in response to the instruction to write the import file to the address data storage area 1101.

Although the present exemplary embodiment has specifically been described based on a case where the address book management application 104 immediately performs the import processing upon reception of an import instruction, the address book management screen 400 may also be provided with a means for setting an execution schedule. In this case, the address book management application 104 has a timer and performs import processing based on the set execution schedule.

With the address book management method in the first exemplary embodiment, the address book management application 104 operating on the virtual machine 103 communicates with the address book management unit 105 via Web services. In communication between the server apparatus and the image forming apparatus 101 by the conventional technique, a communication error may be caused by network traffic or network failure. In the first exemplary embodiment, although a communication error is not caused by an external factor as seen with the conventional technique because communication is carried out within an identical apparatus, a certain error may occur during communication.

Figure 8:
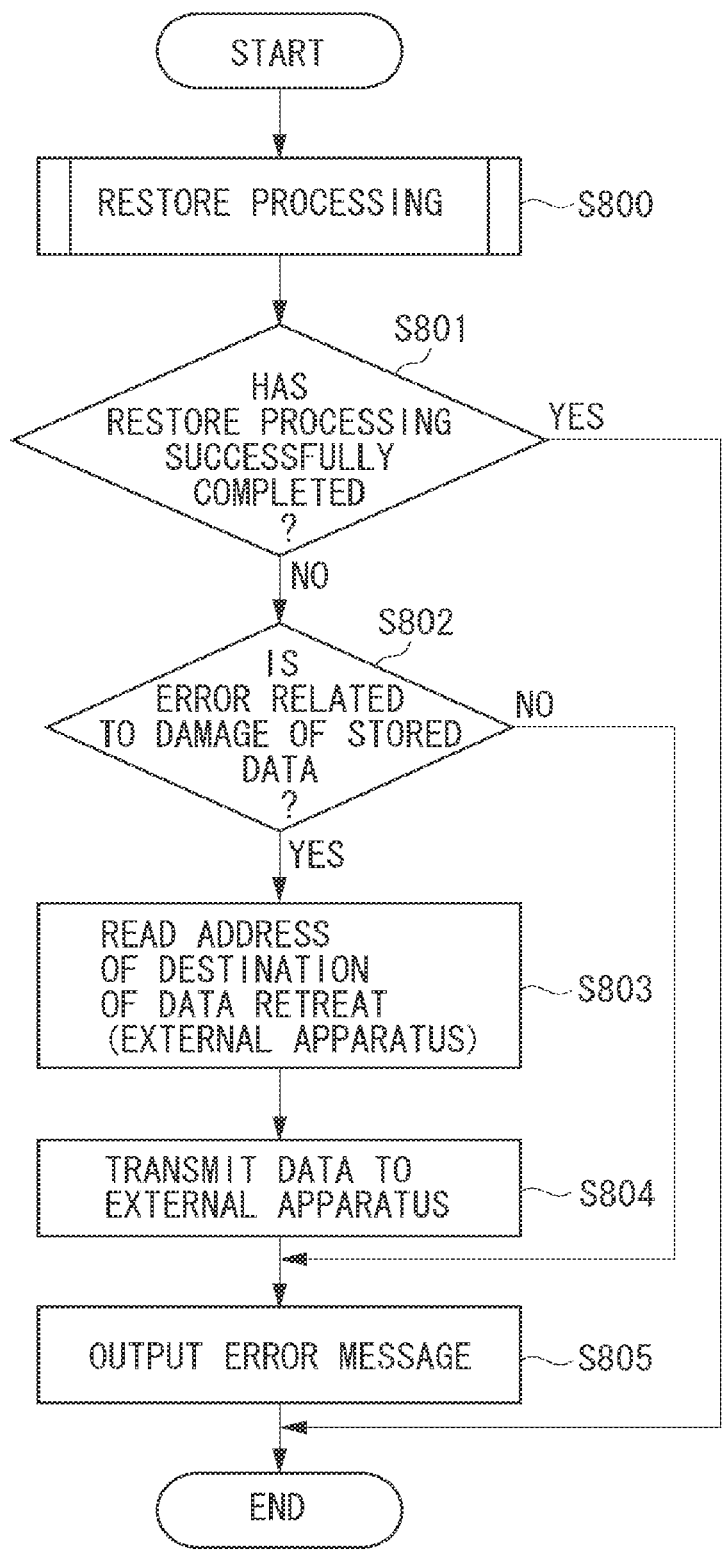
FIG. 8 is a flow chart illustrating error processing when restoring the address book.
Figure 9:
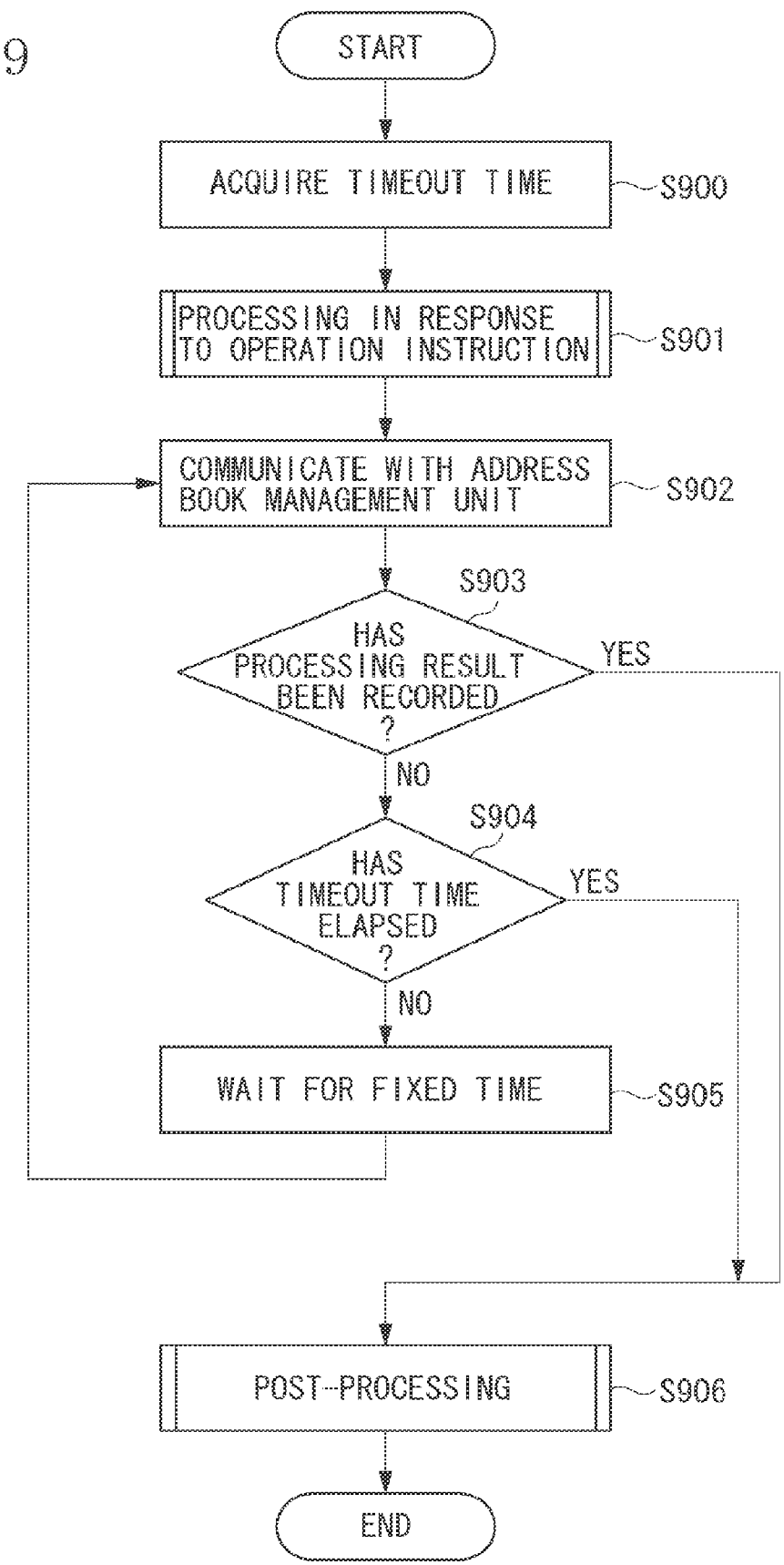
FIG. 9 is a flow chart illustrating processing for recording processing result and reason of error.
Figure 10:
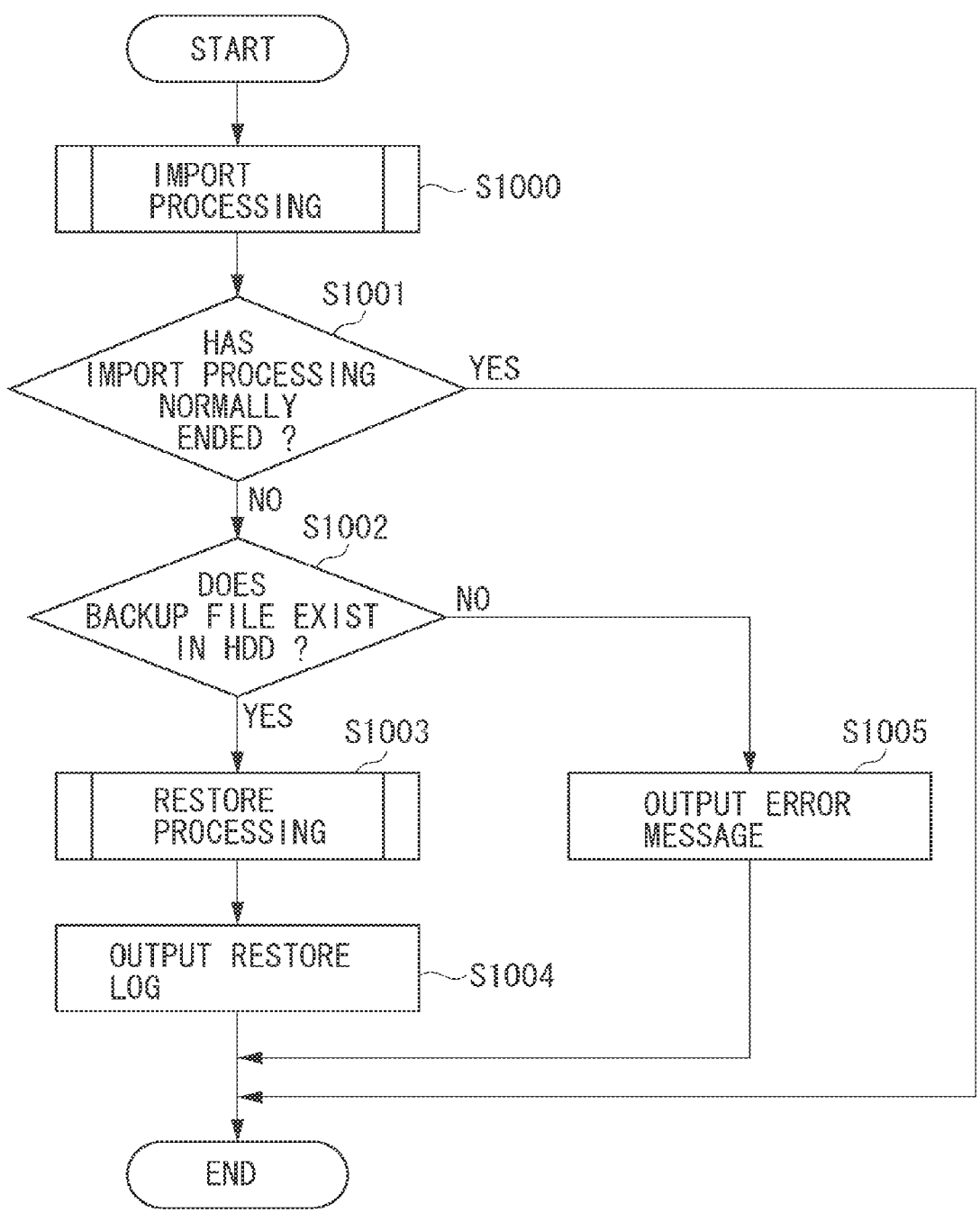
FIG. 10 is a flow chart illustrating processing for automatically restoring the address book.

In a second exemplary embodiment, a method for coping with an error occurring in address book management will be described below with reference to the flow charts in FIGS. 8 to 10. Processing in each step of the flow charts in FIGS. 8 to 10 is executed when the CPU 201 loads a control program stored in the ROM 202 or the HDD 208 of the image forming apparatus 101 into the RAM 203 and then controls each component of the image forming apparatus 101 according to the control program. Since the image forming apparatus 101 and the information processing apparatus included in the data management system and the data management system in the second exemplary embodiment are configured in a similar way to those in the first exemplary embodiment, detailed explanations will be omitted.

FIG. 8 is a flow chart illustrating error processing at the time of restore processing for the address book. When the system administrator presses the restore button in the address book management screen 400 displayed on the web browser 107, the address book management application 104 receives a restore instruction from the client PC 102. When the address book management application 104 receives the restore instruction, the processing of the flow chart in FIG. 5 is started.

In step S800, the address book management application 104 performs the restore processing for the address book. Since the restore processing is similar to that in step S607 of the flow chart in FIG. 6, explanations will be omitted.

In step S801, the data management unit 109 determines whether or not the restore processing has normally ended after execution thereof. When the data management unit 109 determines that the restore processing has normally ended (YES in step S801), the processing ends. Otherwise, when it determines that the restore processing has abnormally ended (NO in step S801), the processing proceeds to step S802. In step S802, the data management unit 109 determines whether or not the cause of abnormal end of the restore processing (reason of error) is an error related to damage to the data stored in storage units. When the data management unit 109 determines that the restore processing has abnormally ended because of damage to the data stored in storage units (YES in step S802), the processing proceeds to step S803. Otherwise, when it determines that the restore processing has abnormally ended not because of damage to the data stored in storage units (NO in step S802), the processing proceeds to step S805. Determination procedures in steps S801 and S802 will be described in detail below with reference to the flow chart in FIG. 9.

Examples of error related to damage of data stored in storage units and an error not related thereto will be described below. An error related to damage of data stored in storage units involves two different cases: a case where the data stored in storage units has been damaged and a case where it is in danger of being damaged. For example, although communication between the address book management application 104 and the address book management unit 105 has successfully been completed and a backup file has been acquired, the backup file cannot be written to the address data storage area 1101, resulting in an error. In this case, a certain error may have occurred in the HDD 208. The backup file in the backup area 1102 of the HDD 208 and the address data in the address data storage area 1101 may have been damaged in a similar way or is likely to be damaged afterward. Therefore, in the case of the above-mentioned error related to damage of the data stored in storage units, it is necessary to retreat the data from the HDD 208 of the image forming apparatus 101 to an external apparatus to protect the data stored in storage units. If a part of the data has already been damaged, even a part of address data is valuable as information. Therefore, data is retreated so as to protect even several addresses. Procedures for retreating data will be described below in processing of step S803 and subsequent steps.

An error not related to damage of the data stored in storage units will be described below. An example of this type of error is damage to a key pair that is necessary for the address book management application 104 and the address book management unit 105 to perform SSL-based encrypted communication therebetween. Further, a communication failure is also caused by an incorrect firmware version of the image forming apparatus 101. In communication between an application and the image forming apparatus 101, the compatibility between the configuration of the virtual machine 103 for operating the application and the firmware version of the image forming apparatus 101 is checked. If there is a compatibility problem, communication is not permitted. This check is made to prevent the application from performing an unexpected operation with an incompatible firmware version. There is a case where firmware upgrading of the image forming apparatus 101 fails and its firmware version becomes incompatible. In this case, communication between the address book management unit 105 and the address book management application 104 of the image forming apparatus 101 will fail. Another cause of communication failure is a timeout error occurring while the image forming apparatus 101 is busy for a certain reason.

When the reason of error is any one of the above-mentioned errors not related to damage of the data stored in storage units, communication between the address book management application 104 and the address book management unit 105 is only disabled. Therefore, the backup file in the backup area 1102 and the address data in the address data storage area 1101 can be determined to be not damaged. Therefore, the processing ends without retreating data.

Returning to description of the flow chart, in step S803, the data management unit 109 reads an address of the external apparatus that is a destination of data retreat. The address of the destination of data retreat may be entered from the address book management screen 400 by the system administrator when setting the restore processing or from a screen for entering an address of the destination of data retreat on the web browser 107 displayed when an error occurs. Further, the client PC 102 that transmitted the restore instruction may be automatically set as the destination of data retreat.

In step S804, the data management unit 109 transmits acquirable data among the backup file in the backup area 1102 and the address data in the address data storage area 1101 to the external apparatus which is the destination of data retreat. In step S805, the address book management application 104 outputs to the web browser 107 of the client PC 102 an error message including the reason of error and details of error processing. An error message may be output by sending a mail including it to the system administrator whose mail address has been entered in advance from the address book management screen 400.

Processing for writing the processing result and the reason of error used to determine whether the restore processing has normally ended in step S801 and determine the reason of error in step S802 of the flow chart in FIG. 8 will be described below with reference to the flow chart in FIG. 9. When the system administrator presses each operation button in the address book management screen 400 displayed on the web browser 107, the address book management application 104 receives each operation instruction from the client PC 102. When the address book management application 104 receives each operation instruction, the processing of the flow chart in FIG. 5 is started.

In step S900, the address book management application 104 acquires a timeout time. The timeout time may be a default value preset in the system or a value entered by the system administrator by using a control for entering a timeout time on the address book management screen 400. The timeout time may also be calculated based on the capability of the image forming apparatus 101 on which the address book management application 104 operates and the amount of data to be operated.

In step S901, the address book management application 104 performs relevant processing such as restore processing and import processing in response to each operation instruction. During the operation, the data management unit 109 issues an instruction to the address book management unit 105 to perform write processing for the address book held thereby. Upon completion of the write processing, the address book management unit 105 records the processing result in a processing result storage area of the HDD 208 managed thereby. In this case, when the processing result is an error, the address book management unit 105 records the reason of error together with the processing result.

In step 902, the data management unit 109 issues an instruction to the address book management unit 105 and then periodically communicates with the address book management unit 105 via the communication unit 108. In step S903, the data management unit 109 checks whether the processing result has been recorded in the processing result recording area through communication in step S902, and determines whether or not the processing in response to each operation instruction is completed. When the data management unit 109 determines that the processing result has not been recorded and processing is not completed (NO in step S903), the processing proceeds to step S904. Otherwise, when the data management unit 109 determines that the processing result has been recorded and processing is completed (YES in step S903), the processing proceeds to step S906.

In step S904, the data management unit 109 determines whether or not the timeout time acquired in step S900 has elapsed. When the data management unit 109 determines that the timeout time has not elapsed (NO in step S904), the processing proceeds to step S905. In step S905, for a fixed time, the processing waits and returns to step S902 in which the data management unit 109 determines again whether processing is completed. Otherwise, when it determines that the timeout time has elapsed (YES in step S904), a timeout error has occurred and the processing proceeds to step S906. In step S906, the data management unit 109 performs post-processing according to the processing result. In subsequent processing, the data management unit 109 determines whether the processing has normally ended based on the processing result, and determines whether the reason of error is an error related to damage of the data stored in storage units based on the reason of error.

Although the present exemplary embodiment has specifically been described based on a case where the address book management application 104 periodically checks the result of processing by the address book management unit 105, the address book management unit 105 may notify the processing result to the address book management application 104.

In the present exemplary embodiment, as mentioned above, if the restore processing has abnormally ended, the image forming apparatus 101 controls retreat of the backup file or address data depending on the reason of error. In the case of an error with which data is likely to be lost, important data for retreating data is protected. On the other hand, in the case of an error with which data is not likely to be lost, useless data retreat is not performed and therefore important data is not carelessly transmitted to the outside, resulting in improved security.

Although only the error processing at the time of restore processing has specifically been described in detail in the present exemplary embodiment, data retreat may be performed in a similar way also in the error processing at the time of import and backup processing.

If an error occurs during import processing for the address book, the address book of the image forming apparatus 101 may be in an imperfect state. In this case, general users cannot use the address book until the system administrator performs import processing again to restore the address book to the normal state. However, for example, when the system administrator sets an execution schedule and performs import processing, the system administrator in some cases cannot confirm completion of the import processing upon completion thereof. In such a case, the system administrator may not immediately notice the occurrence of an import error.

In a third exemplary embodiment, in this case, the restore processing is automatically performed for the address book data before the import processing on a single device basis to enable general users to smoothly perform their operations. This method will be described below with reference to the flow chart in FIG. 10. A program related to this processing is stored in a non-volatile recording area of the image forming apparatus 101, and loaded into the RAM 203 and executed by the CPU 201. Since the image forming apparatus 101 and the information processing apparatus included in the data management system and the data management system in the third exemplary embodiment are configured in a similar way to those in the first exemplary embodiment, detailed explanations will be omitted.

When the system administrator presses the import button in the address book management screen 400 displayed on the web browser 107, the address book management application 104 receives an import instruction from the client PC 102. When the address book management application 104 receives the import instruction, the processing of the flow chart in FIG. 10 is started.

In step S1001, the address book management application 104 performs the import processing. Since the import processing of this flow chart is similar to that of the flowchart in FIG. 7 in the first exemplary embodiment, detailed explanations will be omitted. In step S1001, the data management unit 109 determines whether or not the import processing has normally ended. When the data management unit 109 determines that the import processing has normally ended (YES in step S1001), the processing ends. Otherwise, when it determines that the import processing has abnormally ended (NO in step S1001), the processing proceeds to step S1002.

In step S1002, the data management unit 109 checks whether a backup file exists in the backup area 1102. When the data management unit 109 determines that a backup file exists (YES in step S1002), the processing proceeds to step S1003. Otherwise, when it determines that a backup file does not exist (NO in step S1002), the processing proceeds to step S1005. In step S1003, the address book management application 104 performs the restore processing. Since the restore processing in this flow chart is similar to that of the flow chart in FIG. 7 in the first exemplary embodiment, detailed explanations will be omitted.

In step S1004, the address book management application 104 displays that the import processing has abnormally ended and the restore processing has been performed, on the web browser 107 of the client PC 102 that transmitted the import instruction.

In step S1005, the address book management application 104 displays the reason of error and details of error processing on the web browser 107. Processing result may be displayed in steps S1004 and S1005 by sending a mail to the system administrator whose mail address has been entered in advance from the address book management screen 400.

In the present exemplary embodiment, as mentioned above, if the import processing has abnormally ended because of an error in the image forming apparatus 101, the address book management application 104 automatically performs restore processing for the address book on a single device basis. Automatically performing restore processing for the address book on a single device basis by using the above-mentioned method enables general users to smoothly perform their operations.

Although exemplary embodiments of the present invention have specifically been described with reference to examples, the present invention is not limited to the above-mentioned exemplary embodiments. The present invention is also attained by performing processing including: supplying software (program) for achieving the above-mentioned functions of the exemplary embodiments to a system or apparatus via a network or various types of storage media; and causing a computer (CPU or MPU) of the system or apparatus to load and execute the program. In this case, the program and the storage medium storing the program are included in the present invention.

The present invention is not limited to the above-mentioned exemplary embodiments but can be modified in diverse ways within the ambit of the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A system including an image forming apparatus having a storage device for storing information about the image forming apparatus and an information processing apparatus,
    wherein the information processing apparatus comprises a transmission unit configured to transmit an instruction as to setting data of the image forming apparatus, and
    wherein the image forming apparatus comprises:
        a receiving unit configured to receive an instruction from the information processing apparatus;
        a restoration unit configured to restore, when the received instruction is a restore instruction of the setting data, a backup file stored in a predetermined backup area, as setting data in a setting data storage area of the storage device, wherein the backup file is created according to a set condition; and
        an import unit configured to import, when the received instruction is an import instruction, an import file into the setting data storage area as the setting data,
        wherein, when the importing has abnormally ended, the restoration unit is configured to restore the backup file, as setting data in the setting data storage area.

2. The system according to claim 1, wherein, when the restore instruction includes an instruction for backing up pre-restoration setting data, a backup file of the pre-restoration setting data is created and the created backup file is stored in the predetermined backup area before the setting data is restored.

3. The system according to claim 1, wherein the information processing apparatus further comprises a display unit configured to display a management screen for inputting an instruction as to setting data of the image forming apparatus.

4. The system according to claim 1, wherein the image forming apparatus further comprises a retreating unit configured to perform control to transmit and store the backup file to the information processing apparatus.

5. The system according to claim 1, wherein the predetermined backup area is reserved in the storage device.

6. The system according to claim 1, wherein the setting data is address data constituting an address book.

7. The system according to claim 1, wherein the setting data is user information.

8. The system according to claim 1, wherein the restoration unit and the import unit access the setting data storage area by using a web service.

9. The system according to claim 8, wherein a communication for the access is encrypted.

10. The system according to claim 1, wherein the set condition for creating the backup file indicates a schedule setting.

11. A method for a system including an image forming apparatus having a storage device for storing information about the image forming apparatus and an information processing apparatus, the method comprising:
    transmitting, by the information processing apparatus, an instruction as to setting data of the image forming apparatus;
    receiving, by the image forming apparatus, an instruction from the information processing apparatus;
    restoring, when the received instruction is a restore instruction of the setting data, a backup file stored in a predetermined backup area, as setting data in a setting data storage area of the storage device, wherein the backup file is created according to a set condition;
    importing, when the received instruction is an import instruction, an import file into the setting data storage area as the setting data; and
    restoring the backup file, when the importing has abnormally ended, as setting data in the setting data storage area.

12. The method according to claim 11, further comprising, when the restore instruction includes an instruction for backing up pre-restoration setting data, creating a backup file of the pre-restoration setting data and storing the created backup file in the backup area before the setting data is restored.

13. The method according to claim 11, further comprising displaying a management screen for inputting an instruction as to setting data of the image forming apparatus.

14. The method according to claim 11, further comprising performing control to transmit and store the backup file to the information processing apparatus.

15. The method according to claim 11, wherein the predetermined backup area is reserved in the storage device.

16. The method according to claim 11, wherein the setting data is address data constituting an address book.

17. The method according to claim 11, wherein the setting data is user information.

18. The method according to claim 11, wherein the restoring and importing steps access the setting data storage area by using a web service.

19. The method according to claim 18, wherein a communication for the access is encrypted.

20. The method according to claim 11, wherein the set condition for creating the backup file indicates a schedule setting.

* * * * *